(12) United States Patent
Domingo et al.

(10) Patent No.: US 11,565,551 B2
(45) Date of Patent: Jan. 31, 2023

(54) HOOPING REINFORCEMENT FOR A TIRE OF A HEAVY DUTY CIVIL ENGINEERING VEHICLE

(71) Applicant: COMPAGNIE GENERALE DES ETABLISSEMENTS MICHELIN, Clermont-Ferrand (FR)

(72) Inventors: Alain Domingo, Clermont-Ferrand (FR); Vincent Estenne, Clermont-Ferrand (FR); Cedric Khayat, Clermont-Ferrand (FR); Emmanuel Clement, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/958,349

(22) PCT Filed: Dec. 13, 2018

(86) PCT No.: PCT/FR2018/053252
§ 371 (c)(1),
(2) Date: Jun. 26, 2020

(87) PCT Pub. No.: WO2019/129948
PCT Pub. Date: Jul. 4, 2019

(65) Prior Publication Data
US 2021/0061016 A1     Mar. 4, 2021

(30) Foreign Application Priority Data

Dec. 28, 2017 (FR) ...................................... 1763322

(51) Int. Cl.
*B60C 9/22* (2006.01)
*B60C 9/00* (2006.01)
(Continued)

(52) U.S. Cl.
CPC .......... *B60C 9/2204* (2013.01); *B60C 9/0007* (2013.01); *B60C 9/2006* (2013.01);
(Continued)

(58) Field of Classification Search
CPC . B60C 9/22; B60C 9/2204; B60C 2009/2209; B60C 2009/2214;
(Continued)

(56) References Cited

U.S. PATENT DOCUMENTS 5,032,198 A * 7/1991 Kojima ................. B29D 30/08
156/117
5,843,583 A   12/1998 D'Haene et al.
(Continued)

FOREIGN PATENT DOCUMENTS

EP        572906     * 12/1993
EP     1 787 825 A1    5/2007
(Continued)

OTHER PUBLICATIONS

International Search Report dated Mar. 7, 2019, in corresponding PCT/FR2018/053252 (5 pages).

*Primary Examiner* — Justin R Fischer
(74) *Attorney, Agent, or Firm* — Venable LLP

(57) ABSTRACT

A hooping reinforcement of a tire for a heavy duty civil engineering type vehicle is disclosed. The crown reinforcement (3) of the tire (1), radially on the inside of a tread (2), comprises a protective reinforcement (6), a working reinforcement (5) and a hooping reinforcement (7). Said hooping reinforcement (7) has an axial width at most equal to the smallest axial width (L61, L62) of the two working layers (61, 62), and comprises at least two hooping layers (71, 72) that are formed from strips each made up of elastic metal reinforcers. Each hooping layer (71, 72) is made up of an axial juxtaposition of contiguous turns of the strip (8), which are circumferentially wound around the working layer (51). Each strip (8) is at least 35 mm and at most 250 mm thick, and its distributed breaking tension is at least equal to 100 daN/mm.

9 Claims, 2 Drawing Sheets

(51) Int. Cl.
*B60C 9/20* (2006.01)
*B60C 9/28* (2006.01)

(52) U.S. Cl.
CPC ........ *B60C 9/28* (2013.01); *B60C 2009/0092* (2013.01); *B60C 2009/2012* (2013.01); *B60C 2009/2035* (2013.01); *B60C 2009/2051* (2013.01); *B60C 2009/2064* (2013.01); *B60C 2009/2077* (2013.01); *B60C 2009/2233* (2013.01); *B60C 2009/2242* (2013.01); *B60C 2009/2257* (2013.01); *B60C 2009/2285* (2013.01); *B60C 2200/065* (2013.01)

(58) Field of Classification Search
CPC .... B60C 2009/2228; B60C 2009/2238; B60C 2009/2252; B60C 2009/2276; B60C 2009/228
See application file for complete search history.

(56) References Cited

U.S. PATENT DOCUMENTS

| | | | |
|---|---|---|---|
| 7,337,604 B2 | 3/2008 | Vanneste et al. | |
| 7,575,031 B2 | 8/2009 | Manno et al. | |
| 8,146,637 B2 * | 4/2012 | Radulescu | B60C 11/0083 152/526 |
| 8,166,741 B2 | 5/2012 | Barguet et al. | |
| 8,550,134 B2 * | 10/2013 | Gillard | B60C 9/28 152/526 |
| 10,787,035 B2 | 9/2020 | Domingo | |
| 10,940,719 B2 | 3/2021 | Clement et al. | |
| 2006/0179813 A1 | 8/2006 | Vanneste et al. | |
| 2007/0113946 A1 | 5/2007 | Manno et al. | |
| 2009/0294009 A1 | 12/2009 | Barguet et al. | |
| 2010/0032072 A1 * | 2/2010 | Isobe | B29D 30/3028 152/527 |
| 2017/0028782 A1 | 2/2017 | Miyake | |
| 2017/0182846 A1 | 6/2017 | Clement et al. | |
| 2017/0203613 A1 | 7/2017 | Domingo et al. | |
| 2018/0056723 A1 | 3/2018 | Domingo | |
| 2018/0354308 A1 | 12/2018 | Clayton et al. | |
| 2020/0070581 A1 | 3/2020 | Domingo et al. | |

FOREIGN PATENT DOCUMENTS

| | | | |
|---|---|---|---|
| EP | 1795371 | * | 6/2007 |
| FR | 3 020 016 A1 | | 10/2015 |
| JP | 2006-283199 | * | 10/2006 |
| WO | 2005/014925 A1 | | 2/2005 |
| WO | 2007/090603 A1 | | 8/2007 |
| WO | 2016/139348 A1 | | 9/2016 |
| WO | 2017/105425 A1 | | 6/2017 |

* cited by examiner

HOOPING REINFORCEMENT FOR A TIRE OF A HEAVY DUTY CIVIL ENGINEERING VEHICLE

BACKGROUND

The subject matter of the present invention is a radial tyre, intended to be fitted to a heavy duty civil engineering type vehicle, and more specifically it relates to the crown reinforcement of such a tyre.

Typically, a radial tyre for a heavy duty civil engineering type vehicle, within the meaning of the European Tyre and Rim Technical Organisation or ETRTO standard, is intended to be mounted on a rim with a diameter at least equal to 25 inches. Although not limited to this type of application, the invention is described for a large radial tyre, intended to be mounted on a dumper, a vehicle for transporting materials extracted from quarries or surface mines, by means of a rim with a diameter at least equal to 49 inches, possibly as much as 57 inches, or even 63 inches.

Since a tyre has a geometry of revolution about an axis of rotation, the geometry of the tyre is generally described in a meridian plane containing the axis of rotation of the tyre. For a given meridian plane, the radial, axial and circumferential directions respectively denote the directions perpendicular to the axis of rotation of the tyre, parallel to the axis of rotation of the tyre and perpendicular to the meridian plane. The circumferential direction is tangential to the circumference of the tyre.

In the following text, the expressions "radially inner/radially on the inside" and "radially outer/radially on the outside" mean "closer to" and "further away from the axis of rotation of the tyre", respectively. "Axially inner/axially on the inside" and "axially outer/axially on the outside" mean "closer to" and "further away from the equatorial plane of the tyre", respectively, with the equatorial plane of the tyre being the plane passing through the middle of the tread surface and perpendicular to the axis of rotation.

Generally, a tyre comprises a tread intended to come into contact with the ground via a tread surface, the two axial ends of which are connected via two sidewalls to two beads that provide the mechanical connection between the tyre and the rim on which it is intended to be mounted.

A radial tyre also comprises a reinforcement made up of a crown reinforcement, radially on the inside of the tread, and a carcass reinforcement, radially on the inside of the crown reinforcement.

The carcass reinforcement of a radial tyre for a heavy duty civil engineering type vehicle usually comprises at least one carcass layer comprising generally metal reinforcers coated in a polymeric material of the elastomer or elastomeric type, called coating compound. A carcass layer comprises a main part that joins the two beads together and is generally wound, in each bead, from the inside to the outside of the tyre around a circumferential reinforcing element that is most often metal and is called bead wire, so as to form a turn-up. The metal reinforcers of a carcass layer are substantially mutually parallel and form an angle of between 85° and 95° with the circumferential direction.

The crown reinforcement of a radial tyre for a heavy duty civil engineering type vehicle comprises an overlay of circumferentially extending crown layers, radially on the outside of the carcass reinforcement. Each crown layer is made up of generally metal reinforcers that are mutually parallel and are coated in a polymeric material of the elastomer or coating compound type.

Among the crown layers, a distinction is usually made between the protective layers, which make up the protective reinforcement and are radially outermost, and the working layers, which make up the working reinforcement and are radially included between the protective reinforcement and the carcass reinforcement.

The protective reinforcement, comprising at least one protective layer, basically protects the working layers from mechanical or physicochemical attacks, which are likely to spread through the tread radially towards the inside of the tyre.

The protective reinforcement often comprises two protective layers, which are radially overlaid, formed of elastic metal reinforcers, are mutually parallel in each layer and are crossed from one layer to the next, forming angles at least equal to 10° with the circumferential direction.

The purpose of the working reinforcement, comprising at least two working layers, is to belt the tyre and impart stiffness and road holding thereto. It absorbs both mechanical inflation stresses, which are generated by the tyre inflation pressure and are transmitted by the carcass reinforcement, and mechanical stresses caused by running, which stresses are generated as the tyre runs over the ground and are transmitted by the tread. It also has to withstand oxidation and impacts and puncturing, by virtue of its intrinsic design and that of the protective reinforcement.

The working reinforcement usually comprises two working layers, which are radially overlaid, formed of inextensible metal reinforcers, are mutually parallel in each layer and are crossed from one layer to the next, forming angles at least equal to 15° and at most equal to 60°, and preferably at least equal to 15° and at most equal to 45°, with the circumferential direction.

In order to reduce the mechanical inflation stresses that are transmitted to the working reinforcement, disposing a hooping reinforcement radially on the inside of the working reinforcement and radially on the outside of the carcass reinforcement is known. The hooping reinforcement, the function of which is to at least partially absorb the mechanical inflation stresses, improves the endurance of the crown reinforcement by stiffening the crown reinforcement. The hooping reinforcement also can be positioned radially between two working layers of the working reinforcement or radially on the outside of the working reinforcement.

The hooping reinforcement comprises at least one hooping layer and usually two hooping layers, which are radially overlaid, formed of metal reinforcers, are mutually parallel, and form angles at most equal to 2.5°, and preferably around 0°, with the circumferential direction.

With respect to the metal reinforcers, a metal reinforcer is mechanically characterized by a curve representing the tensile force (in N) applied to the metal reinforcer as a function of the relative elongation (in %) thereof, known as the force-elongation curve. Mechanical tensile characteristics of the metal reinforcer, such as the structural elongation As (in %), the total elongation at break At (in %), the force at break Fm (maximum load in N) and the breaking strength Rm (in MPa) are derived from this force-elongation curve, with these characteristics being measured in accordance with the 1984 ISO 6892 standard.

The total elongation at break At of the metal reinforcer is, by definition, the sum of the structural, elastic and plastic elongations thereof (At=As+Ae+Ap). The structural elongation As results from the relative positioning of the metal threads making up the metal reinforcer under a low tensile force. The elastic elongation Ae results from the actual elasticity of the metal of the metal threads making up the metal reinforcer, taken individually, with the behaviour of the metal following Hooke's law. The plastic elongation Ap results from the plasticity, i.e. the irreversible deformation beyond the yield point, of the metal of these metal threads taken individually. These different elongations and the respective meanings thereof, which are well known to a person skilled in the art, are described, for example, in documents U.S. Pat. No. 5,843,583, WO 2005/014925 and WO 2007/090603.

A tensile modulus is also defined, at any point on the force-elongation curve of a metal reinforcer, which modulus is expressed in GPa and represents the gradient of the straight line tangential to the force-elongation curve at this point. In particular, the tensile modulus of the elastic linear part of the force-elongation curve is referred to as the elastic tensile modulus or Young's modulus.

Among the metal reinforcers, a distinction is usually made between the elastic metal reinforcers, such as those used in the protective layers, and the inextensible metal reinforcers, such as those used in the working layers.

An elastic metal reinforcer is characterized by a structural elongation As at least equal to 1% and a total elongation at break At at least equal to 4%. Moreover, an elastic metal reinforcer has an elastic tensile modulus at most equal to 150 GPa, and usually between 40 GPa and 150 GPa.

An inextensible metal reinforcer is characterized by a total elongation At, under a tensile force equal to 10% of the force at break Fm, at most equal to 0.2%. Moreover, an inextensible metal reinforcer has an elastic tensile modulus usually between 150 GPa and 200 GPa.

The metal reinforcers are coated in an elastomeric compound. In order to characterize the composite layer, the mechanical properties of the coating compound are normally described.

An elastomeric compound can be mechanically characterized, in particular after curing, by its dynamic properties, such as a dynamic shear modulus $G^*=(G'^2+G''^2)^{1/2}$, where $G'$ is the elastic shear modulus and $G''$ is the viscous shear modulus, and a dynamic loss $tg\delta=G''/G'$. The dynamic shear modulus $G^*$ and the dynamic loss $tg\ \delta$ are measured on a viscosity analyzer of the Metravib VA4000 type according to standard ASTM D 5992-96. The response of a sample of a vulcanized elastomeric compound in the form of a 4 mm thick and 400 mm$^2$ cross-section cylindrical test specimen, subjected to a simple alternating sinusoidal shear stress, at a frequency of 10 Hz, with a deformation amplitude sweep from 0.1% to 50% (outward cycle) and then from 50% to 0.1% (return cycle), at a given temperature, for example, equal to 60° C., is recorded. These dynamic properties are thus measured for a frequency equal to 10 Hz, a deformation equal to 50% of the peak-to-peak deformation amplitude, and a temperature that can be equal to 60° C. or 100° C.

An elastomeric compound can also be characterized by static mechanical properties. The tensile tests allow the elasticity stresses and the properties at break to be determined. Unless otherwise indicated, they are carried out in accordance with French Standard NF T 46-002 dated September 1988. The "nominal" secant moduli (or apparent stresses, in MPa) at 10% elongation (denoted "MA10") and 100% elongation (denoted "MA100") are measured in second elongation (i.e. after an accommodation cycle). All these tensile measurements are carried out under standard temperature (23±2° C.) and hygrometry (50±5% relative humidity) conditions, according to French Standard NF T 40-101 (December 1979). The breaking stresses (in MPa) and the elongations at break (in %) are also measured, at a temperature of 23° C.

Document WO 2016/139348 describes an architecture of a tyre for a heavy duty civil engineering type vehicle as described above and comprising a hooping reinforcement formed by a circumferential winding of a ply comprising circumferential elastic metal reinforcers that make angles at most equal to 2.5° with the circumferential direction, said circumferential winding of the ply extending from a first circumferential end to a second circumferential end radially on the outside of the first circumferential end, so as to form a radial stack of at least two hooping layers, the hooping reinforcement being radially positioned between the two working layers of a working reinforcement.

When manufacturing a tyre as described in document WO 2016/139348, the hooping layer is actually a ply comprising elastic metal reinforcers, known as ply of metal reinforcers, and is initially stored on a reel. Then, it is unwound and laid by being circumferentially wound radially on the outside of the tyre layers that are already radially stacked. The ply of metal reinforcers is wound over at least two turns so as to produce at least two hooping layers that are radially overlaid, with a circumferential offset between the end at the start of winding and the end at the end of winding such that, over a limited circumferential distance, or covering length, the hooping reinforcement comprises three hooping layers. The winding is carried out continuously using a single portion of ply of metal reinforcers. Thus, the hooping reinforcement does not contain any discontinuity. As a result, a portion of ply of metal reinforcers may remain, on the initial storage reel, that is unusable since it is not long enough to produce the hooping reinforcement in one piece. This residual portion of ply of metal reinforcers that is unusable for manufacturing because it is not long enough is also known as waste ply. The existence of such waste plies, which results in a loss of material, has a negative effect on the manufacturing cost of the tyre.

An alternative solution for avoiding the loss of associated material, or overlapping the ends of the plies or waste, is to produce a butt weld. These waste plies are attached by bringing together the ends of the two portions to be joined. The space between these two ends is a discontinuity, which is filled with an elastomeric bonding compound that bonds the two portions of ply of metal reinforcers by welding. This is referred to as butt welding in that there is no overlap between the two portions of ply.

During use, these two solutions have the disadvantage of degrading the uniformity of the tyre and the productivity of the method.

The inventors have set themselves the objective of reducing the manufacturing cost of a tyre for a heavy duty civil engineering type vehicle, and, in particular, that of the hooping reinforcement thereof, while ensuring the same endurance performance level of the crown thereof.

SUMMARY

This objective has been achieved by a tyre for a heavy duty civil engineering type vehicle, comprising:
- a crown reinforcement, radially on the inside of a tread and radially on the outside of a carcass reinforcement;
- the crown reinforcement comprising a protective reinforcement, a working reinforcement and a hooping reinforcement;
- the protective reinforcement, which is radially outermost in the crown reinforcement, comprising at least one protective layer, the protective layer is made up of metal reinforcers that form an angle at least equal to 10° with a circumferential direction (XX') tangential to the circumference of the tyre;

the working reinforcement comprising at least two working layers, each working layer comprising metal reinforcers that form an angle at least equal to 15° and at most equal to 45° with the circumferential direction (XX') and are crossed from one working layer to the next;

the hooping reinforcement having an axial width at most equal to the smallest axial width of the two working layers, and comprising at least two hooping layers that are formed from strips each made up of elastic metal reinforcers that form an angle at most equal to 2.5° with the circumferential direction (XX');

each hooping layer is made up of an axial juxtaposition of contiguous turns of the strip, which are circumferentially wound around the first working layer, radially innermost in the working reinforcement;

the strip comprises at least 8 and at most 30 parallel, consecutive metal reinforcers coated in an elastomer compound;

the distributed breaking tension Nr of the strip, in the circumferential direction, is at least equal to 100 daN/mm.

BRIEF DESCRIPTION OF THE DRAWINGS

The invention will be understood better from reading the following description, which is given solely by way of non-limiting example and with reference to the drawings (not shown to scale), in which.

DETAILED DESCRIPTION

Figure 1:
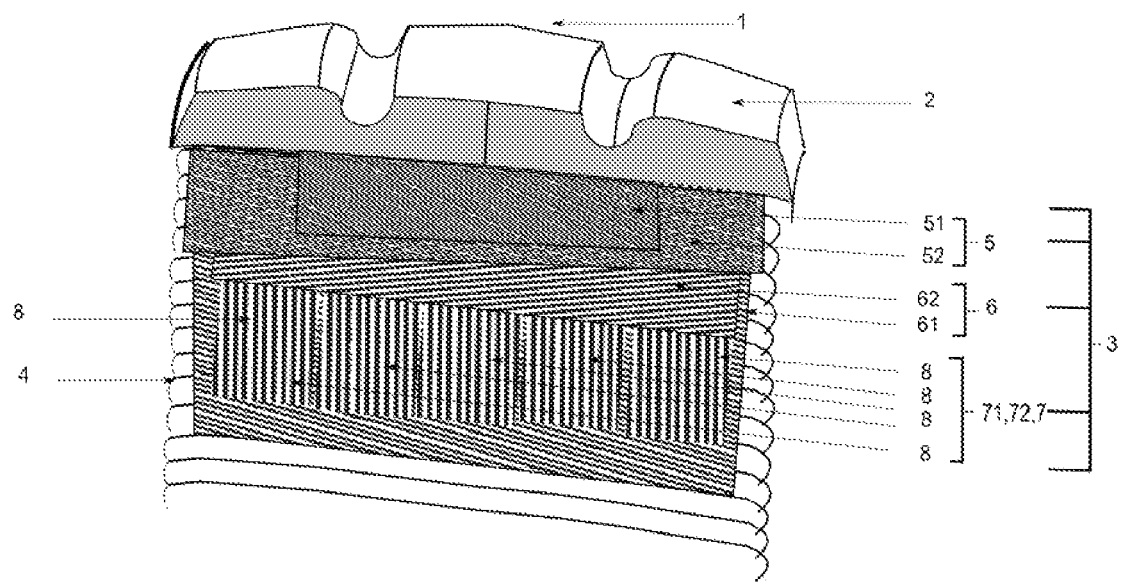
FIG. 1 shows a cutaway perspective view of the crown of a tire 1 according to the invention.

The idea of the invention is to replace the plies used to manufacture the hooping layers with a contiguous helical winding, in the axial direction, of a strip around the first working layer. The strip is made up of a limited number of reinforcers, for example, from eight to thirty, that are parallel and are coated in an elastomeric compound. Therefore, the width of the strip depends both on the diameter and on the gap between two consecutive reinforcers.

In the prior art, some composite layers are made up of strips, but they are most often composed of textile reinforcers such as, for example, polyester, polyamide, aramid or even any combination of these fibres.

The strip proposed by the invention is characterized by metal reinforcers with large diameters ranging from 1.5 mm to 3.8 mm. The reinforcers are actually ropes obtained by assembling elementary strands according to different patterns of geometric arrangements.

The inventors propose steel ropes called "layered" ropes made up of a central core and of one or more layers of concentric threads disposed around this core. The most commonly used layered ropes are basically ropes with an "M+N" or "M+N+P" construction formed from a core of L thread(s) surrounded by at least one layer of M threads, optionally itself surrounded by an external layer of N threads.

The invention also proposes a coating compound adapted for use in a civil engineering tyre for which control of the operating temperature is an essential element for ensuring its endurance. The composition of the compound is designed so as to minimize its hysteresis and the shearing forces experienced in the composite layer.

In order to guarantee the endurance of the crown reinforcement, the inventors have proposed a minimum coating compound thickness of 0.6 mm on the back of the ropes, and a melting point between two consecutive ropes of 2.5 mm to 4.4 mm.

The inventors have reached a technical and economical compromise with respect to the nature of the reinforcement, its assembly from elementary strands, the coating compound for determining the optimal composite layer for the endurance performance levels and the industrial manufacturing cost for the design of the tyre.

With respect to the architecture of the crown reinforcement, the hooping reinforcement advantageously is radially included between two working layers of the working reinforcement.

Indeed, such an architecture allows, by virtue of the use of circumferential reinforcers located close to the neutral axis of the crown, the deformation of the crown to be limited to the shoulders. This therefore makes it possible to obtain both the expected endurance performance with regard to cleavage of the crown and the intended impact resistance performance by virtue of a crown that is flexible at the centre and is able to tolerate the deformation due to impacts when the vehicle drives over obstacles. Specifically, when passing over an obstacle, the crown of the tyre acts as a beam, the neutral axis of which is located between the working layers depending on the type of deformation that is imposed. The neutral bending axis of the crown reinforcement is located between the stiffest crown layers, i.e. between the working layers. By positioning the circumferential reinforcers between said working layers, the solution minimizes the stresses, and the bending deformations associated with this stress, that the circumferential reinforcers must tolerate.

The metal reinforcers of the hooping reinforcement are preferably elastic.

The shape factor at a given point of the hooping reinforcement is equal to the ratio of the radius R of said point on the shaped and vulcanized tyre to the radius R0 of the same point on the unshaped tyre, with R and R0 being measured with respect to the axis of rotation of the tyre. By being positioned on the hooping reinforcement at the intersection with the equatorial plane, the ratio of relative variation of radii (R−R0)/R0 represents the maximum circumferential elongation experienced by the metal reinforcers on account of the manufacturing method. The elasticity of the correctly sized reinforcers allows anticipation and absorption of the forces induced by the method for manufacturing the tyre.

According to the invention, each hooping layer is made up of an axial juxtaposition of contiguous turns of the strip, which are circumferentially wound around the first working layer, radially innermost in the working reinforcement.

When manufacturing the tyre with hooping layers laid in the form of plies, the width is determined by the capability of the upstream method for producing the ply. Laying the hooping layer by juxtaposing a strip wound around the first working layer removes this width constraint and therefore allows the hooped part of the crown to be increased. This new solution for producing the hooping of the tyre improves the performance of the product by having larger and tighter hooping with strips, as opposed to the use of plies. It follows that the shear amplitudes at the ends of the working layers are sufficiently reduced to detect the effect on the endurance of the tyre.

Still according to the invention, the strip comprises at least 8 and at most 30 parallel, consecutive metal reinforcers coated in an elastomer compound.

The width of the strip is the result of a compromise between the performance of the product and the industrial performance. The narrower the strip, the longer the cycle time for winding around the first working layer. On the other hand, controlling the hooped width and the tightening level is easier with a narrow strip. The inventors have established that a strip width determined by assembling 8 to 30 reinforcers allows this compromise to be optimized, with the reinforcers having a length diameter of 1.9 mm to 3.8 mm.

Still according to the invention, the breaking tension Nr of the strip, in the circumferential direction, is at least equal to 100 daN/mm.

The breaking tension of the strip corresponds to the limit tension that can be tolerated by the strip when it is extended in the direction of the reinforcers. Within the context of the invention, the reinforcers are oriented in the circumferential direction of the tyre. The pitch, which is the distance between two consecutive reinforcers in a meridian section of the strip, varies from 2.5 mm to 4.4 mm for reinforcers with a minimum breaking force of 250 daN. The minimum breaking force of the strip is deduced therefrom with a value of 100 daN/mm.

According to the invention, the width of the strip is at least equal to 35 mm and at most equal to 252 mm. The diameter of the reinforcers of the strip is at least equal to 1.9 mm.

The width of the strip is deduced from the diameter of the reinforcers constituting the strip and from their pitch. The invention particularly functions for reinforcers with a diameter of 1.9 mm to 4 mm, and for pitches that vary from 2.5 mm to 4.4 mm.

Still according to the invention, the elastomeric coating compound of the metal reinforcers of the strip has viscoelastic loss Tg δ that is less than or equal to 0.09.

The coating compound of the reinforcers of the strip is the site of significant shear deformations both in the meridian and circumferential planes during the use of the tyre. These deformations that are experienced by the elastomeric compound are the source of the increase in temperature in this zone of the tyre. The composition of this mixture must be adapted relative to its stresses. The inventors have estimated that a viscoelastic loss measured by Tg δ assigned a value of 0.09 ensures that the average operating temperature is maintained in this zone within limits acceptable for the proper operation of the invention. The viscoelastic loss is measured as described above.

Preferably, the metal reinforcers of the strip are multistrand ropes of structure 1×N, comprising a single layer of N strands wound in a helix, each strand comprising an internal layer of M internal threads wound in a helix and an external layer of P external threads wound in a helix around the internal layer.

According to a first embodiment of the multistrand ropes, N=3 or N=4, preferably N=4. Preferably, the reinforcer is defined with 4 strands, but the option with 3 strands is equally suitable.

According to a second embodiment of the multistrand ropes, M=3, 4 or 5, preferably M=3.

According to a third embodiment of the multistrand ropes, wherein P=7, 8, 9, 10 or 11, preferably P=8.

These reinforcers are designed so as to obtain significant elongation under low tensile stress loads. The preferred choice results in reinforcers of the type: 4×(3+8)×0.35, i.e. ropes with 44 threads with an individual diameter of each thread of 35 hundredths of a millimetre. The use of such reinforcers improves the endurance of the tyres by increasing the resistance to tensile stresses when passing over obstacles.

Its use can be extended to the protective layers, which allows the local deformations imposed when driving over obstacles to be tolerated. These reinforcers have a diameter at least equal to 3.8 mm and a force at break at least equal to 850 daN. The high value of the diameter allows the shear deformations of the protective layer to be absorbed over a greater thickness, which generates lower shear stresses. The high value of the force at break allows the reinforcer to tolerate higher breaking stresses, thereby improving the performance of the crown in terms of impact endurance. Finally, the elasticity of these reinforcers during the manufacturing phase promotes the expansion of the laying diameter resulting from curing the tyres in a mould.

The invention is not limited to the previously studied reinforcers. Other assemblies are possible such as, for example, the 3×(1+6)×0.28 rope, which represents a reinforcer with 21 threads with an individual diameter of 28 hundredths of millimetres. The diameter of such a rope is 1.9 mm and its breaking force is 250 daN.

The invention also relates to a method that comprises a step of producing the carcass reinforcement that is distinct from the step of producing the crown reinforcement, in which the layers of the crown reinforcement, including the hooping layers, are laid on a cylindrical form, then transferred onto the carcass reinforcement. The hooping layers are obtained by circumferential and axial helical winding of the strip (8) on the first working layer (61), then the second working layer (62), the protective reinforcement and finally the tread are radially wound on the outside of the hooping reinforcement.

The helical, axial contiguous winding of the strip (8) around the first working layer (61) can be implemented in various ways. According to one embodiment of the invention, a first complete circumferential winding turn of the strip (8) is successively performed at a first axial end of the hooping layer, then contiguous helical winding of the strip (8) is performed in the axial direction up to a second axial end of the hooping layer, and a final complete circumferential winding turn of the strip (8) is performed at the second axial end of the hooping layer.

The invention is not limited to the previously described method for producing the hooping reinforcement. It relates to any helical winding of the strip around the first working layer (61). It particularly includes the case whereby the helical winding in the axial direction of the strip is not contiguous, where from one turn to the next, the strip overlaps.

The invention is illustrated in FIGS. 1 to 4, which are not shown to scale for the sake of understanding.

FIG. 1 shows a cutaway perspective view of the crown of a tyre 1 according to the invention having:

a tread 2 radially on the outside of a carcass reinforcement 4;

the crown reinforcement 3 comprising a protective reinforcement 5, a working reinforcement 6 and a hooping reinforcement 7;

The elastomeric coating compound of the reinforcers of the strip typically, but not exclusively, have the following composition, consolidated in table 1:

TABLE 1

| Composition | NR (Natural Rubber) Elastomer | Carbon black N326 | Antioxidant | ZnO | Stearic acid | Sulphur | DCBS | OPF Epoxy resin | Cobalt salt | CTP |
|---|---|---|---|---|---|---|---|---|---|---|
| Elastomeric compound of the strip | 100 | 47 | 1.5 | 7.5 | 0.9 | 5.63 | 0.8 | 0.5 | 1.5 | 0.15 | the protective reinforcement 5, which is radially outermost in the crown reinforcement 3, comprising two protective layers (51, 52), each protective layer (51, 52) comprising metal reinforcers that form an angle at least equal to 10° with a circumferential direction (XX') tangential to the circumference of the tyre;

the working reinforcement 6 comprising two working layers (61, 62), each working layer (61, 62) comprising metal reinforcers that form an angle at least equal to 15° and at most equal to 45° with the circumferential direction (XX') and are crossed from one working layer to the next;

the hooping reinforcement (7) is made up of an axial juxtaposition of contiguous turns of the strip (8), which are circumferentially wound around the first working layer. In FIG. 1, the strips are separate, but in reality they are contiguous. The second layer 71 is overlaid on the second layer 72.

Figure 2:
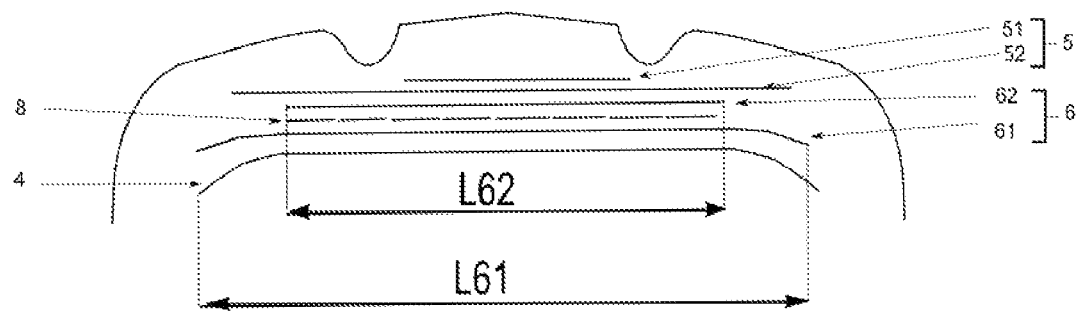
FIG. 2 shows a view in the meridian plane that identifies the widths of the layers of a tire 1 according to the invention.

FIG. 2 shows a view in the meridian plane that identifies the widths of the layers. In particular, the width of the second working layer that corresponds to the maximum width of the hooping layer.

Figure 3:
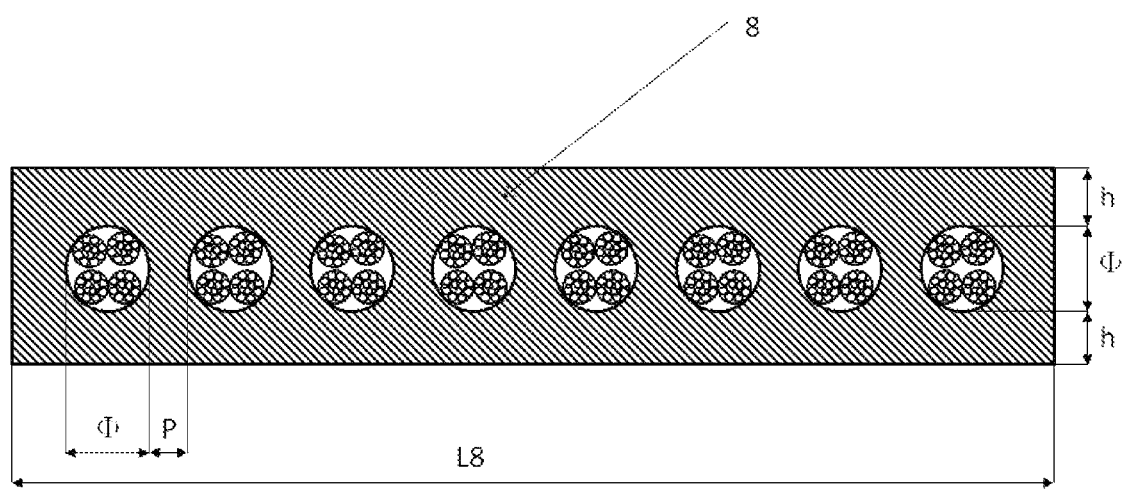
FIG. 3 shows the strip identifying the diameter of the reinforcer, the pitch P of the reinforcers, as well as the thickness h of the coating rubber, which is greater than or equal to 0.6 mm of a tire 1 according to the invention.

FIG. 3 shows the strip identifying the diameter of the reinforcer, the pitch P of the reinforcers, as well as the thickness h of the coating rubber, which is greater than or equal to 0.6 mm. The diameter Φ of the reinforcers varies from 1.9 mm to 3.8 mm. The width L8 of the strip depends on the diameter and on the pitch of the reinforcers, which is the distance P between two consecutive reinforcers. Typically, the width L8 is defined for a number of reinforcers ranging from 8 to 30, and the pitch ranges from 2.5 mm to 4.4 mm. In FIG. 3, the strip is shown with 8 reinforcers. The width of the strip can vary from 35 mm to 252 mm.

Figure 4:
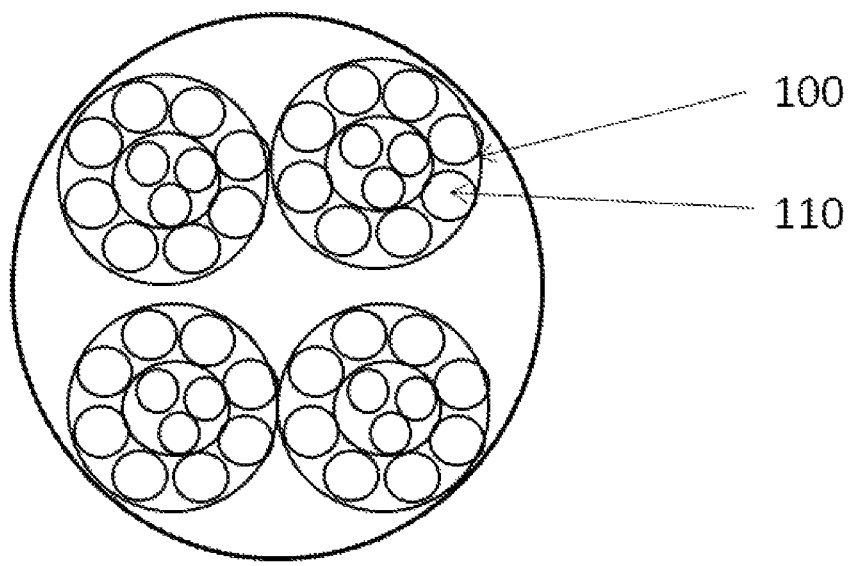
FIG. 4 shows a reinforcer of the strip made up of 4 strands (100) each formed by an internal layer of 3 threads and by an external layer of 8 threads (110) of a tire 1 according to the invention.

FIG. 4 shows a reinforcer of the strip made up of 4 strands (100) each formed by an internal layer of 3 threads and by an external layer of 8 threads (110).

The invention was implemented on a 59/80R63 sized tyre for a heavy duty civil engineering type vehicle. The tyre according to the invention differs from the reference tyre by the production of the hooping reinforcement. For the reference tyre, the hooping reinforcement was obtained by continuously winding a metal ply on two turns around the first working layer. For the invention, the hooping is made up of an axial juxtaposition of contiguous turns of a strip (8), which are circumferentially wound around the first working layer.

Among other things, the invention differs from the prior art through the use of strips formed by elastic metal reinforcers with large diameters ranging from 1.9 mm to 3.8 mm, with a breaking force that ranges from 250 daN to 850 daN.

The mechanical properties consolidated into table 2 below correspond to this composition of the coating compound:

TABLE 2

| Results | Elastomeric coating compound of the strip |
|---|---|
| Shore A | 67 |
| Ma10 | 5.2 MPa |
| MA100 | 2.6 MPa |
| Tg (δ) | 0.09 |
| G' (10%) | 2.12 MPa |

The thickness of the strip can vary from 3.1 mm to 5 mm. The thickness of the coating compound on the back of the reinforcers can reach 0.6 mm. For a hooping reinforcement with two layers, the cumulative thickness of the compound on the back of the reinforcers can be greater than 2.4 mm. The dimensions of the tyres affected by the invention have a rim diameter that can be up to 63 inches. It is possible to deduce that the volume of the coating compound becomes high and that therefore its selection must be optimized with respect to its hysteresis, its shore A hardness and its stiffness.

The static stiffness modulus of the coating compound of the strip has a value of 5.2 MPa at 10% deformation and a value of 2.6 MPa at 100% deformation. Dynamically, at 10% deformation, the dynamic stiffness modulus has a value of 2.12 MPa.

The endurance of a tyre for civil engineering is directly correlated with the operating temperature caused by the viscoelastic loss of the elastomeric compounds. The inventors have established that the viscoelastic loss of the coating compound of the strip must have a level of Tg δ that is approximately equal to 0.09 for correct operation of the invention.

Another advantage of the invention relates to the industrial manufacturing cost, which is substantially lower for a hooping reinforcement laid as a strip compared to the reference configuration using plies. The cycle for manufacturing the hooping reinforcement with a strip is shorter, and the loss of material associated with losses is lower. However, another method gain appears with respect to the flexibility provided by this solution, with respect to the width of the crown to be hooped and the control of the level of tightening of the hoop. The width limitations associated with the upstream methods for obtaining plies are removed when manufacturing with a strip.

The invention also relates to an improvement of the endurance of the tyre. The separation of the working layers (61, 62) from the crown reinforcement (3) is one of the common failure modes of these types of tyres. When the shearing forces in the circumferential planes and in the meridian planes are too high, cracks begin to appear, then spread until the plies separate, which leads to the sudden failure of the tyre. The following result shows that hooping with the use of the strip allows a wider hoop to be provided, accompanied by a 14% reduction of the shearing level in the coating compound of the working layers:

TABLE No 2

|  | Hooped width | Circumferential elongation |
|---|---|---|
| Hooping with plies | 520 mm | 100 |
| Hooping with strip | 740 mm | 114 |

Another improvement of the invention relates to the thrust forces of the tyre on a curved path. The cornering stiffness is associated with the thrust forces generated by the tyre in corners. Here again, hooping with strips provides a significant improvement of approximately 17% gains relative to the reference tyre hooped with a ply, as shown in table No 3:

TABLE No 3

| Variant | Cornering stiffness (daN/° cornering) | Cornering stiffness (base 100) |
|---|---|---|
| Hooping with plies | 9335 | 100 |
| Hooping with strip | 10958 | 117 |

The invention claimed is:

1. A tire for a heavy duty civil engineering type vehicle, the tire comprising:
   a crown reinforcement, radially on an inside of a tread and radially on an outside of a carcass reinforcement,
   the crown reinforcement comprising a protective reinforcement, a working reinforcement and a hooping reinforcement,
   the protective reinforcement, which is radially outermost in the crown reinforcement, comprising at least one protective layer, the protective layer comprising metal reinforcers that form an angle at least equal to 10° with a circumferential direction tangential to a circumference of the tire,
   the working reinforcement comprising at least two working layers, each working layer comprising metal reinforcers that form an angle at least equal to 15° and at most equal to 45° with the circumferential direction and are crossed from one working layer to an adjacent working layer,
   the hooping reinforcement having an axial width at most equal to a smallest axial width of the at least two working layers, and comprising at least two hooping layers that are formed from strips each made of elastic metal reinforcers that form an angle at most equal to 2.5° with the circumferential direction,
   the strips having an axial width and a circumferential distributed breaking tension Nr,
   wherein each hooping layer is made of an axial juxtaposition of contiguous turns of a strip, which are circumferentially wound around a first working layer, radially innermost in the working reinforcement,
   wherein each strip comprises at least 8 and at most 30 parallel, consecutive, elastic metal reinforcers coated in an elastomeric compound,
   wherein, a distance measured between two elastic metal reinforcers of each strip in a meridian section is at least equal to 2.5 mm, and
   wherein the distributed breaking tension Nr of each strip, in the circumferential direction, is at least equal to 100 daN/mm.

2. The tire for a heavy duty civil engineering type vehicle according to claim 1, wherein a width of each strip is at least equal to 35 mm and at most equal to 252 mm.

3. The tire for a heavy duty civil engineering type vehicle according to claim 1, wherein a diameter of the elastic metal reinforcers of each strip is at least equal to 1.9 mm.

4. The tire for a heavy duty civil engineering type vehicle according to claim 1, wherein the elastomeric compound coating the elastic metal reinforcers of each strip has viscoelastic loss Tg δ that is less than or equal to 0.09.

5. The tire for a heavy duty civil engineering type vehicle according to claim 1, wherein the elastic metal reinforcers of each strip are multistrand ropes of structure 1×N, comprising a single layer of N strands wound in a helix, each strand comprising an internal layer of M internal threads wound in a helix and an external layer of P external threads wound in a helix around the internal layer.

6. The tire for a heavy duty civil engineering type vehicle according to claim 5, wherein N=3 or N=4.

7. The tire for a heavy duty civil engineering type vehicle according to claim 5, wherein M=3, 4 or 5.

8. The tire for a heavy duty civil engineering type vehicle according to claim 5, wherein P=7, 8, 9, 10 or 11.

9. A method for manufacturing a tire according to claim 1, the method comprising:
   producing the hooping reinforcement by, for each hooping layer, performing a first complete circumferential winding turn of a strip at a first axial end of the hooping layer, then performing contiguous helical winding of the strip in the axial direction up to a second axial end of the hooping layer, and finally performing a final complete circumferential winding turn of the strip at the second axial end of the hooping layer.

* * * * *